United States Patent
Byun et al.

(10) Patent No.: US 9,350,010 B2
(45) Date of Patent: May 24, 2016

(54) SECONDARY BATTERY AND METHOD FOR FABRICATING THE SAME

(75) Inventors: Sangwon Byun, Yongin-si (KR);
Seokyoon Yoo, Yongin-si (KR);
Sungbae Kim, Yongin-si (KR); Yonghae Kang, Yongin-si (KR); Jinmo Kim, Yongin-si (KR); Kyoungsoo Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1282 days.

(21) Appl. No.: 12/897,675

(22) Filed: Oct. 4, 2010

(65) Prior Publication Data
US 2011/0305943 A1    Dec. 15, 2011

(30) Foreign Application Priority Data
Jun. 9, 2010    (KR) .................. 10-2010-0054486

(51) Int. Cl.
*H01M 2/02* (2006.01)
*H01M 2/30* (2006.01)
*H01M 2/04* (2006.01)
(Continued)

(52) U.S. Cl.
CPC .............. *H01M 2/305* (2013.01); *H01M 2/043* (2013.01); *H01M 2/0473* (2013.01); *H01M 2/26* (2013.01); *H01M 10/0413* (2013.01); *Y10T 29/4911* (2015.01)

(58) Field of Classification Search
CPC ... H01M 2/043; H01M 2/0473; H01M 2/305; H01M 10/0413; H01M 2/26; Y10T 29/4911

USPC ......... 429/161–164, 166, 170, 174, 178–181, 429/158; 29/623.1–623.5
See application file for complete search history.

(56) References Cited

U.S. PATENT DOCUMENTS 6,579,640 B1    6/2003  Nagase et al.
2005/0221174 A1*  10/2005  Yoon ........................... 429/161
(Continued)

FOREIGN PATENT DOCUMENTS

JP      2001-93486      4/2001
JP      2008-300083     12/2008
(Continued)

OTHER PUBLICATIONS

Patent Abstracts of Japan, and English machine translation of Japanese Publication 2008-300083, 34 pages.
(Continued)

*Primary Examiner* — Gary Harris
(74) *Attorney, Agent, or Firm* — Lewis Roca Rothgerber Christie LLP (57) ABSTRACT

A secondary battery includes an electrode assembly having a first electrode, a second electrode, and a separator located between the first electrode and the second electrode; a first collector plate electrically coupled to the first electrode; a case housing the electrode assembly and the first collector plate and having an opening; a cap assembly sealing the opening of the case and being electrically coupled to the first collector plate; a first electrode terminal comprising a first electrode terminal plate electrically coupled to the cap assembly; and a second electrode terminal protruding through the cap assembly, electrically coupled to the second electrode and electrically insulated from the cap assembly.

13 Claims, 7 Drawing Sheets

(51) Int. Cl.
*H01M 2/26* (2006.01)
*H01M 10/04* (2006.01)

(56) References Cited

U.S. PATENT DOCUMENTS

| | | |
|---|---|---|
| 2005/0221176 A1 | 10/2005 | Kim |
| 2005/0287429 A1 | 12/2005 | Cho et al. |
| 2009/0155632 A1* | 6/2009 | Byun et al. ............ 429/7 |
| 2011/0052949 A1* | 3/2011 | Byun et al. ............ 429/61 |
| 2011/0244310 A1* | 10/2011 | Kim ............ 429/158 |

FOREIGN PATENT DOCUMENTS

| | | |
|---|---|---|
| KR | 10-2001-0030515 | 4/2001 |
| KR | 10-2005-0096289 | 10/2005 |
| KR | 10-2005-0121907 | 12/2005 |
| KR | 10-2009-0127809 | 12/2009 |

OTHER PUBLICATIONS

Patent Abstracts of Japan, and English machine translation of Japanese Publication 2001-93486, 11 pages.

KIPO OA dated Aug. 30, 2011 for Korean priority application 10-2010-0054486, 3 pages.

\* cited by examiner

SECONDARY BATTERY AND METHOD FOR FABRICATING THE SAME

RELATED APPLICATIONS

This application claims priority to and the benefit of Korean Patent Application No. 10-2010-0054486, filed on Jun. 9, 2010, in the Korean Intellectual Property Office, and titled: "SECONDARY BATTERY AND METHOD FOR FABRICATING THE SAME," is incorporated by reference herein in its entirety.

BACKGROUND

1. Field

Embodiments relate to a secondary battery and a method for fabricating the same.

2. Description of the Related Art

Generally, unlike a primary battery, a secondary battery may be recharged. Low-capacity batteries, in which one battery cell is made into a battery pack, is used as a power source for various portable small electronic devices such as cellular phones, camcorders or the like. Large-capacity batteries, in which several to tens of battery cells are made into a battery pack, are used as the power source for motor driven devices such as hybrid electric vehicles.

Secondary batteries may be classified into different types, for example, cylindrical or prismatic batteries. The secondary battery is generally configured by an electrode assembly formed by locating a separator as an insulator between a positive electrode and a negative electrode is inserted inside a container with an electrolyte, and assembling a cap assembly having electrode terminals with the container.

SUMMARY

Embodiments are directed to a secondary battery and a method for fabricating the same. According to aspects of the present invention, a secondary battery is provided having a simplified cap plate and capable of securely coupling the cap plate to an electrode terminal.

In one embodiment, a secondary battery is provided including an electrode assembly having a first electrode, a second electrode, and a separator located between the first electrode and the second electrode; a first collector plate electrically coupled to the first electrode; a case housing the electrode assembly and the first collector plate and having an opening; a cap assembly sealing the opening of the case and being electrically coupled to the first collector plate; a first electrode terminal comprising a first electrode terminal plate electrically coupled to the cap assembly; and a second electrode terminal protruding through the cap assembly, electrically coupled to the second electrode and electrically insulated from the cap assembly.

In one embodiment, the first collector plate includes a first extending part contacting the first electrode; and a first connecting part extending at an angle from the first extending part and contacting the cap assembly. The secondary battery may further include a second collector plate comprising a second extending part contacting the second electrode, and a second connecting part extending at an angle from the second extending part and contacting the second electrode terminal.

In one embodiment, the cap assembly includes at least one protrusion part extending generally away from the electrode assembly, wherein the first electrode terminal plate has at least one hole part generally corresponding to the at least one protrusion part, wherein the at least one protrusion part of the cap assembly generally engages the hole part of the first electrode terminal plate. Further, the first electrode terminal plate may include a first flange part having the hole part and contacting the cap assembly; and a second flange part extending at an angle from the first flange part and configured to contact an external device. In one embodiment, the protrusion part and the first flange part are welded together at the hole part.

Further, in one embodiment, a height from a top surface of the cap assembly to a first end of the second flange part is substantially equal to a height from the top surface of the cap assembly to a first end of the second electrode terminal.

Additionally, the first electrode terminal plate is generally flat, and further includes a first electrode bulk portion generally conforming to a surface of the first electrode terminal plate. In one embodiment, a height from the top surface of the cap assembly to a first end of the second electrode plate is substantially equal to a sum of a height from the top surface of the cap assembly to a top first of the first electrode terminal plate and a height from the first end of the first electrode terminal plate to a first end of the first electrode bulk portion.

In another embodiment, a method for fabricating a secondary battery is provided, the secondary battery including an electrode assembly having a first electrode plate, a second electrode plate and a separator therebetween, a first collector plate electrically connected to the first electrode plate, a case housing the electrode assembly and the first collector plate, a cap assembly sealing the case, having a protrusion part extending generally away from the electrode assembly and contacting the first collector plate, and a second electrode terminal electrically connected to the second electrode plate, wherein the second electrode terminal protrudes through and is electrically insulated from the cap assembly, the method including placing a first electrode terminal plate having a hole part on the cap assembly such that the protrusion part is positioned within the hole part; and welding an outer periphery of the protrusion part to the inner circumference of a wall defining the hole part.

In one embodiment, placing the first electrode terminal plate includes placing a first flange part having the hole part on the cap assembly; and orienting a second flange part extending from the first flange part and configured to contact an external device to extend generally away from the electrode assembly. Additionally, after the welding, the method may further include placing a first electrode bulk portion on the first electrode terminal plate, the first electrode bulk portion generally conforming to the first electrode plate; and welding the first electrode plate and the first electrode bulk portion to each other.

As described above, since the secondary battery according to the embodiments of the present invention includes a first electrode terminal at an upper portion of a cap plate without passing through the cap plate, sealing efficiency of the secondary battery is improved compared to forming the first electrode terminal by passing it through a cap plate. In addition, in the secondary battery according to the embodiments of the present invention, it is not necessary to form a through hole for the first electrode terminal in a cap plate, thereby simplifying a configuration of the cap plate.

Further, in the secondary battery according to the embodiment of the present invention, the upper portion of the first electrode plate in the first electrode terminal, a side upper end of the first electrode plate, and a side bottom end of the first electrode bulk portion are welded, thereby facilitating a welding process and allowing the first electrode terminal to be securely coupled to the cap assembly.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

A configuration of the secondary battery according to an embodiment of the present invention will now be described.

Figure 1:
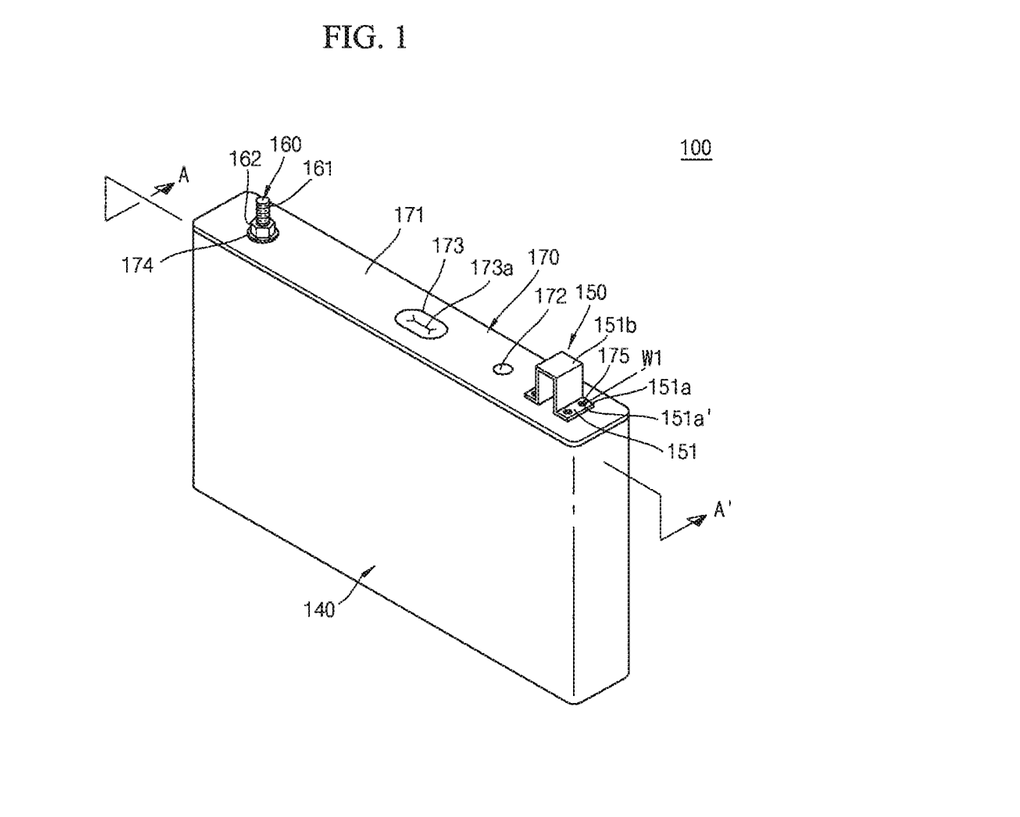
FIG. 1 is a perspective view of a secondary battery according to an embodiment of the present invention.
Figure 2:
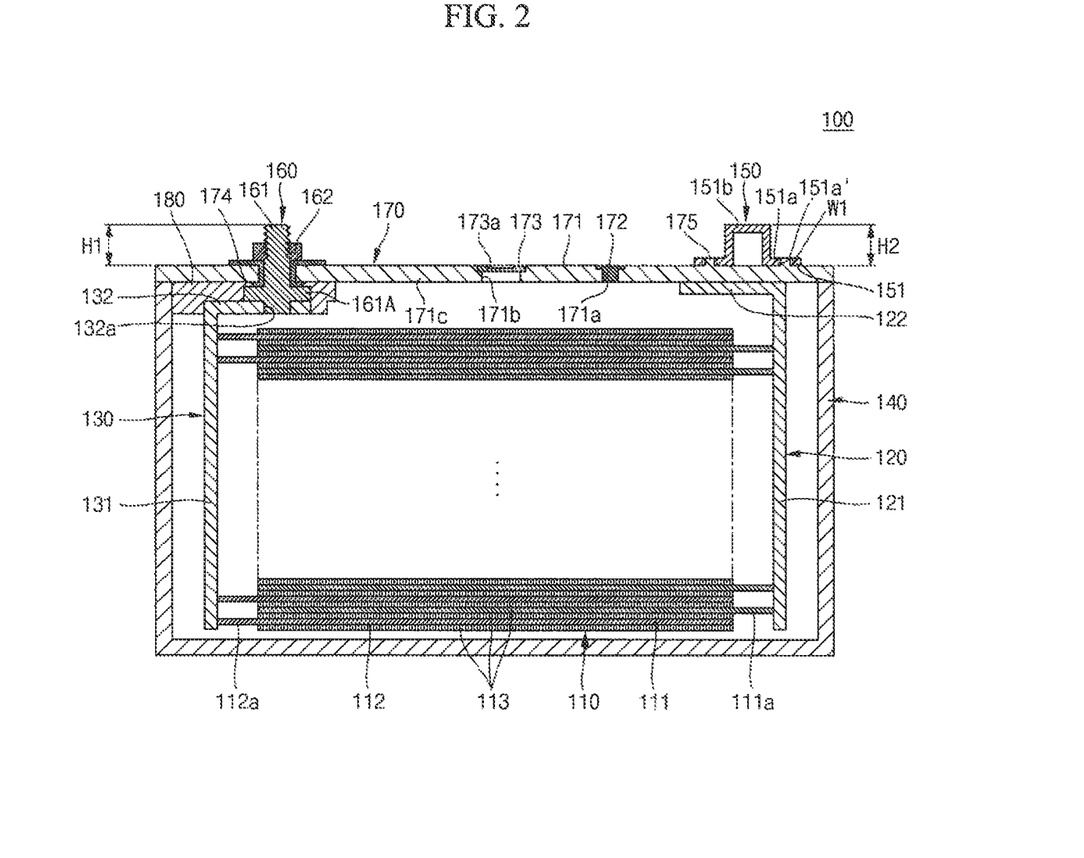
FIG. 2 is a cross-sectional view of the secondary battery taken along the line A-A' of FIG. 1.

FIG. 1 is a perspective view of a secondary battery according to an embodiment of the present invention, and FIG. 2 is a cross-sectional view of the secondary battery taken along the line A-A' of FIG. 1.

Referring to FIGS. 1 and 2, the secondary battery 100 according to the embodiment of the present invention includes an electrode assembly 110, a first collector plate 120, a case 140, a first electrode terminal 150, a second electrode terminal 160, and a cap assembly 170. The secondary battery 100 may further include a second collector plate 130 and a lower insulation member 180.

The electrode assembly 110 includes a first electrode plate 111, a second electrode plate 112, formed as a plate or a film, and a separator 113 located between the first electrode plate 111 and the second electrode plate 112. In addition, the electrode assembly 110 is formed by stacking and winding a stacked structure of the first electrode plate 111, the second electrode plate 112 and the separator 113. In one embodiment, the first electrode plate 111 may function as a positive or negative electrode, and the second electrode plate 112 may have a polarity opposite to that of the first electrode plate 111. In the following, the invention will be described assuming that the first electrode plate 111 is a positive electrode and the second electrode plate 112 is a negative electrode.

The first electrode plate 111 is formed by coating a first electrode active material such as a transition metal oxide on a first electrode current collector formed of a metal foil made of, for example, aluminum. In addition, the first electrode plate 111 includes a first electrode uncoated portion 111a that is not coated with a first active material. The first electrode uncoated portion 111a becomes a current flow path between the first electrode plate 111 and the exterior side of the first electrode plate 111. However, aspects of the present invention are not limited to the material of the first electrode plate 111 listed herein.

The second electrode plate 112 is formed by coating a second electrode active material such as graphite or carbon on a second electrode current collector formed of a metal foil made of, for example, nickel or copper. In addition, the second electrode plate 112 includes a second electrode uncoated portion 112a that is not coated with a second active material. The second electrode uncoated portion 112a becomes a current flow path between the second electrode plate 112 and the exterior side of the second electrode plate 112. However, aspects of the present invention are not limited to the material of the second electrode plate 112 listed herein.

The separator 113 is located between the first electrode plate 111 and the second electrode plate 112 prevents a short circuit and allows movement of lithium ions. The separator 113 may be formed of polyethylene, polypropylene, or a composite film of polyethylene and polypropylene. However, aspects of the present invention do not limit the material of the separator 113.

The first collector plate 120 includes a first extending part 121 and a first connecting part 122. The first collector plate 120 may be made of, for example, aluminum.

The first extending part 121 may have a plate shape and contacts the first electrode uncoated portion 111a of the first electrode plate 111.

The first connecting part 122 may have a plate shape and is bent and extends from the first extending part 121. In addition, the first connecting part 122 contacts a bottom end of the cap assembly 170, which will later be described.

The second collector plate 130 includes a second extending part 131 and a second connecting part 132. The second collector plate 130 may be made of a conductive material such as nickel.

The second extending part 131 may have a plate shape and contacts the second electrode uncoated portion 112a of the second electrode plate 112.

The second connecting part 132 may have a plate shape and is bent and extends from the second extending part 131. Further, a second terminal hole 132a may be provided inside the second connecting part 132.

The case 140 may be shaped of a box having an upper opening. The case 140 receives the electrode assembly 110, the first collector plate 120 and the second collector plate 130 in its internal space. In addition, the case 140 may be formed of a conductive metal such as aluminum, an aluminum alloy or nickel plated steel. The inner surface of the case 140 is processed by insulation treatment, so that it can be insulated from the electrode assembly 110, the first collector plate 120 and the second collector plate 130. Here, the case 140 may have a polarity to function as, for example, a positive electrode.

The first electrode terminal 150 includes a first electrode terminal plate 151 having a first flange part 151a and a second flange part 151b.

The first flange part 151a may have a plate shape. In addition, the first flange part 151a is formed to contact an upper end of the cap plate 171 of the cap assembly 170. In addition, at least one hole part 151a' generally conforming to a protrusion part 175 of the cap assembly 170 may be formed in the first flange part 151a.

The second flange part 151b may be upwardly bent and extend from the first flange part 151a. In addition, the second flange part 151b may have a flat upper portion to facilitate contact with an external device.

The second electrode terminal 160 includes a second bolt part 161 and a second nut part 162. The second electrode terminal 160 is electrically connected to the second collector plate 130. In other words, the second flange part 161a provided in the second bolt part 161 is placed in the second connecting part 132, and a bottom end of the second bolt part 161 may be engaged with a second terminal hole 132a of the second connecting part 132. The second nut part 162 allows the second bolt part 161 to be securely fastened with the cap assembly 170, which will later be described. The second electrode terminal 160 allows the second electrode plate 112 to be electrically connected to an external device.

A height H1 from a top surface of the cap assembly 170 to a top surface of the second electrode terminal 160 may be substantially equal to a height H2 from the top surface of the cap assembly 170 to a top surface of the second flange part 151b of the first electrode terminal 150. In other words, the top surface of the first electrode terminal 150 and the top surface of the second electrode terminal 160 may be at substantially the same height. The secondary battery 100 according to the embodiment of the present invention may come into contact with an external device efficiently and easily by substantially matching heights of the first electrode terminal 150 and the second electrode terminal 160.

The cap assembly 170 may include a cap plate 171, a plug 172, a vent plate 173, a gasket 174, and a protrusion part 175.

The cap plate 171 may have a plate shape. In addition, the cap plate 171 may seal the upper opening of the case 140. In addition, the first electrode terminal 150 may be formed on one side of the cap plate 171. Further, the second electrode terminal 160 may be formed on the other side of the cap plate 171 while protruding through the cap plate 171 outwardly from the inside of the cap plate 171. The cap plate 171 may further include an electrolyte injection hole 171a and a vent hole 171b. The cap plate 171 is electrically connected to the first electrode plate 111 through the first collector plate 120, and may have the same polarity with the first electrode plate 111, that is, a positive polarity.

The plug 172 seals the electrolyte injection hole 171a of the cap plate 171.

The vent plate 173 is formed at the vent hole 171b of the cap plate 171 and seals the vent hole 171b. The vent plate 173 may include a notch 173a configured to be opened when internal pressures of the case 140 and the cap assembly 170 are greater than a threshold level.

The gasket 174 is provided between the second electrode terminal 160 and the cap plate 171 and seals a gap between the second electrode terminal 160 and the cap plate 171. The gasket 174 prevents external moisture from permeating the secondary battery 100 or an electrolyte contained in the secondary battery 100 from leaking to the outside. The gasket 174 may be made of an insulating material.

At least one of the protrusion part 175 may be formed at the upper end of the cap plate 171. The protrusion part 175 may be formed to have a shape generally corresponding to a hole part 151a' of the first electrode terminal plate 151 in the first electrode terminal 150. The outer circumference of the protrusion part 175 of the cap assembly 170 may be coupled to the inner circumference of the hole part 151a' of the first electrode terminal plate 151 by welding. The welding may be performed by applying heat to the outer circumference of the protrusion part 175 of the cap assembly 170 and the inner circumference of the hole part 151a' of the first electrode terminal plate 151 using a welding rod 10. As the result of the welding, a weld W1 may be formed. In addition, the protrusion part 175 may be integrated into the cap plate 171.

In such a manner, because the first electrode terminal plate 151 is welded to the cap plate 171 at an opened upper portion of the first electrode terminal plate 151, instead of the lateral portion of the first electrode terminal plate 151 at which the first electrode terminal plate 151 vertically contacts the cap plate 171, the welding can be easily performed.

The lower insulation member 180 is formed between the cap plate 171 and the second collector plate 130. The lower insulation member 180 is made of an insulating resin and allows the second collector plate 130 and the cap plate 171 to be electrically insulated.

A configuration of the secondary battery according to another embodiment of the present invention will now be described.

Figure 3:
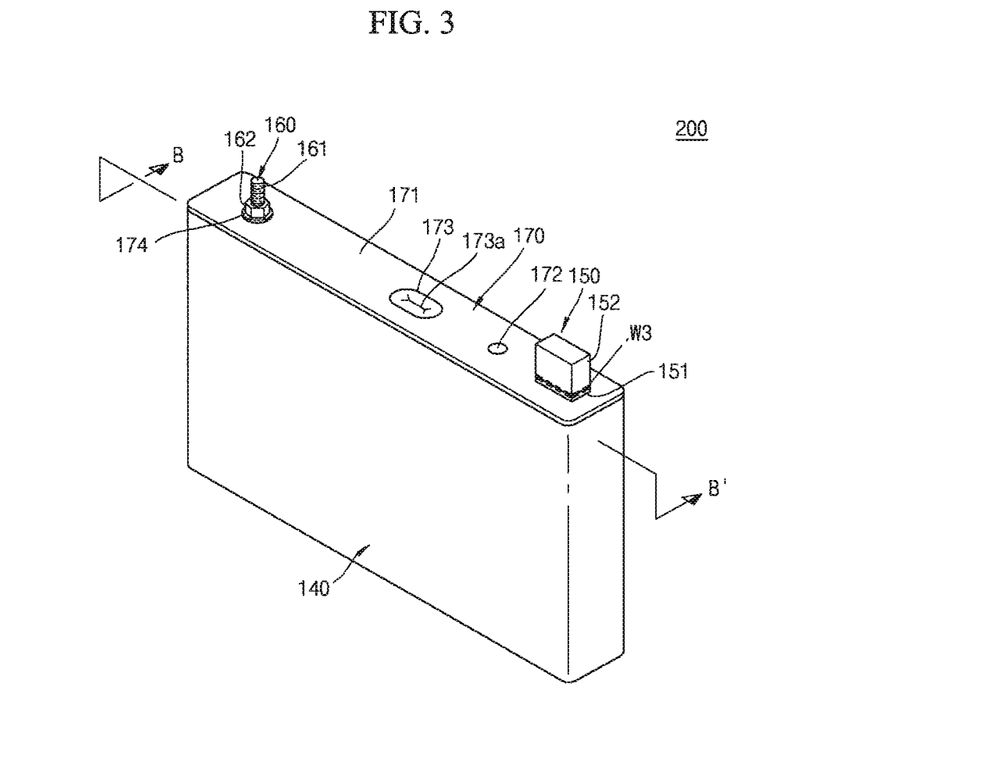
FIG. 3 is a perspective view of a secondary battery according to another embodiment of the present invention.
Figure 4:
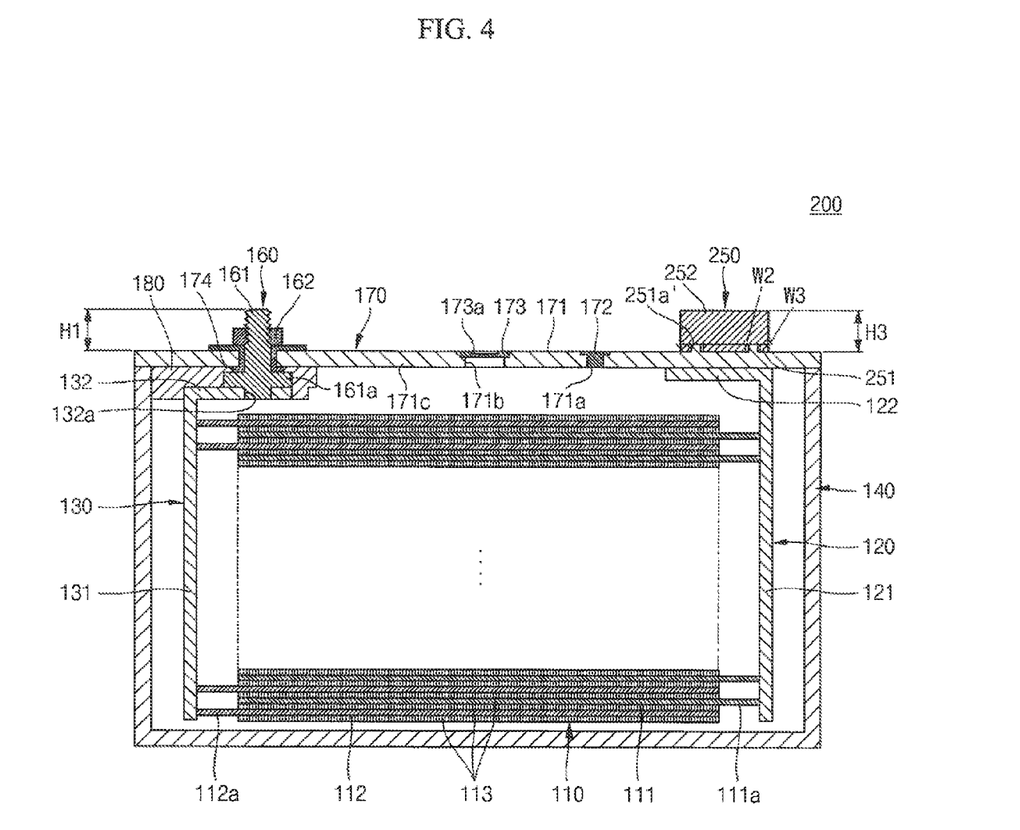
FIG. 4 is a cross-sectional view of the secondary battery taken along the line B-B' of FIG. 3.

FIG. 3 is a perspective view of a secondary battery according to another embodiment of the present invention, and FIG. 4 is a cross-sectional view of the secondary battery taken along the line B-B' of FIG. 3.

Referring to FIGS. 3 and 4, the secondary battery 200 according to another embodiment of the present invention is different from the secondary battery 100 shown in FIGS. 1 and 2 in view of a structure of a first electrode terminal 250. Thus, in the following, the secondary battery 200 will be described with regard to the first electrode terminal 250. In addition, the components that have the same function as those shown in the drawings of the former embodiment are referred to as the same reference numeral, and the description thereof will be omitted.

The secondary battery 200 according to another embodiment of the present invention includes an electrode assembly 110, a first collector plate 120, a case 140, a first electrode terminal 250, a second electrode terminal 160, and a cap assembly 170. In addition, the secondary battery 200 may further include a second collector plate 130.

The first electrode terminal 250 may include a first electrode terminal plate 251, and a first electrode bulk portion 252.

The first electrode terminal plate 251 may have a plate shape. In addition, at least one hole part 251a' conforming to the protrusion part 175 of the cap assembly 170 may be formed in the first electrode terminal plate 251. In addition, the outer circumference of the protrusion part 175 of the cap assembly 170 may be coupled to the inner circumference of the hole part 251a' of the first electrode terminal plate 251 by welding. The coupling method of the first electrode terminal plate 251 and the cap plate 171 will be described in greater detail. The first electrode terminal plate 251 may be made of aluminum.

A first electrode bulk portion 252 may be formed on the first electrode terminal plate 251 and generally conforms to an upper portion of the first electrode terminal plate 251. While FIGS. 3 and 4 illustrate the upper portion of the first electrode terminal plate 251 having a generally rectangular shape and the first electrode bulk portion 252 having a rectangular parallelepiped corresponding to the shape of the first electrode terminal plate 251, aspects of the present invention are not limited thereto. In other words, the first electrode terminal plate 251 may have an upper portion having a circular shape, and the first electrode bulk portion 252 may be shaped of a cylinder corresponding to the shape of the first electrode terminal plate 251. In addition, the first electrode bulk portion 252 may have a flat upper portion to facilitate a contact with an external device. Further, the first electrode bulk portion 252 may be made of aluminum.

A height H1 from a top surface of the cap assembly 170 to a top surface of the second electrode terminal 160 may be substantially equal to a sum H3 of a height from the top surface of the cap assembly 170 to a top end of the first electrode terminal plate 251 and a height from the top end of the first electrode terminal plate 251 to a top end of the first electrode bulk portion 252. In other words, the top surface of the first electrode terminal 150 and the top surface of the second electrode terminal 160 may be substantially the same height. The secondary battery 200 according to the embodiment of the present invention may come into contact with an external device efficiently and easily due to the heights of the first electrode terminal 150 and the second electrode terminal 160 being substantially equal.

A method for fabricating the secondary battery according to another embodiment of the present invention will now be described in detail.

Figure 5:
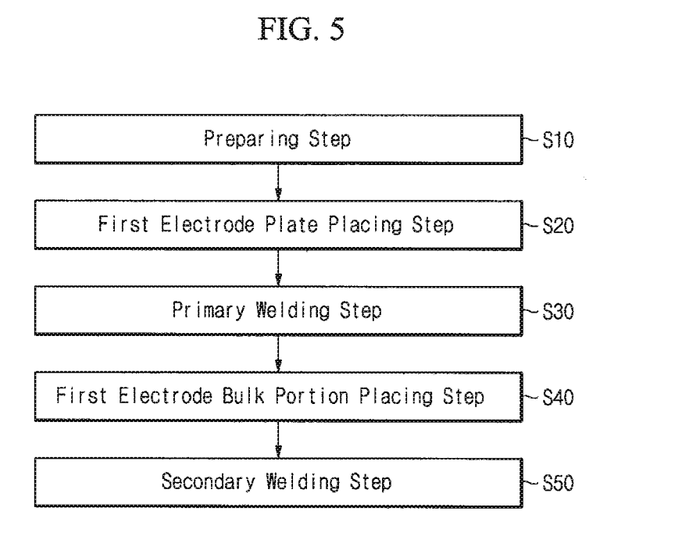
FIG. 5 is a flowchart describing a method for fabricating the secondary battery according to another embodiment of the present invention.

FIG. 5 is a flowchart for explaining a method for fabricating the secondary battery according to another embodiment of the present invention, and FIGS. 6A, 6B, 6C and 6D illustrate a method for forming a first electrode terminal shown in FIGS. 3 and 4.

Referring to FIG. 5, the fabricating method of the secondary battery according to the present invention includes a preparing step (S10), a first electrode plate placing step (S20) and a primary welding step (S30). The fabricating method may further include a first electrode bulk portion placing step (S40) and a secondary welding step (S50).

Figure 6A:
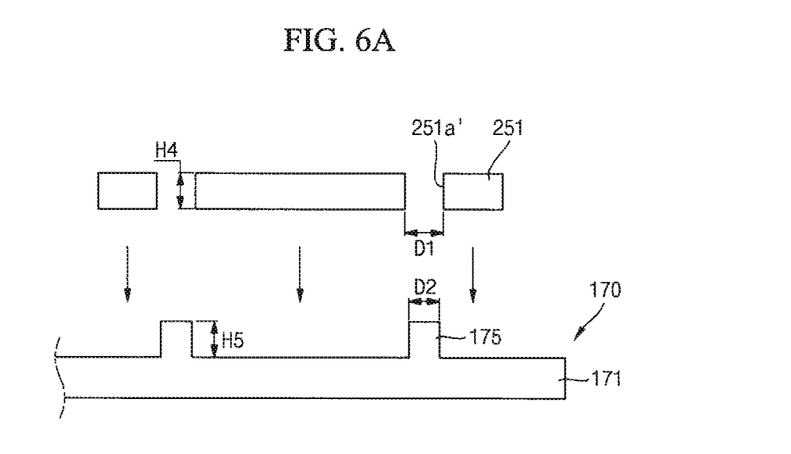
FIGS. 6A through 6D illustrate a method for forming a first electrode terminal shown in FIGS. 3 and 4.

Referring to FIGS. 3 through 5 together with FIG. 6A, in the preparing step S10, the electrode assembly 110, the case 140, the cap assembly 170, and the second electrode terminal 160 are prepared. Here, the electrode assembly 110 has an upper opening and includes the first electrode plate 111, the second electrode plate 112 and separator 113 accommodated therein. The case 140 accommodates the first collector plate 120 electrically connected to the first electrode plate 111. The cap assembly 170 covers the upper end of the case 140, has the protrusion part 175 formed on its upper portion and contacts the first collector plate 120 at its lower portion. The second electrode terminal 160 electrically connected to the second electrode plate 112, penetrates from a lower portion to an upper portion of the other side of the cap assembly 170 and is electrically insulated from the cap assembly 170.

Referring to FIGS. 5 and 6A, in the first electrode plate placing step (S20), the first electrode terminal plate 251 shaped of a plate is placed on the cap assembly 170. Here, the first electrode terminal plate 251 may have the hole part 251a' generally corresponding to the protrusion part 175 of the cap assembly 170. In addition, in the first electrode plate placing step (S20), the first electrode terminal plate 251 may be placed on the cap assembly 170 such that the protrusion part 175 is positioned within the hole part 251a'. In one embodiment, a diameter D2 of the protrusion part 175 may be smaller than a diameter D1 of the hole part 251a'. In addition, a vertical height H5 of the protrusion part 175 may be smaller than or equal to a vertical height H4 of the hole part 251a'.

Figure 6B:
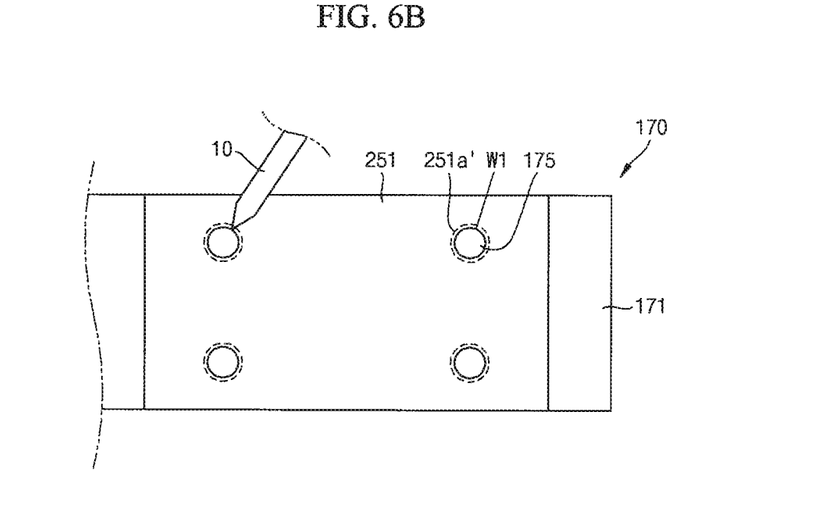

Referring to FIGS. 5 and 6B, in the first welding step (S30), the outer circumference of the protrusion part 175 is coupled to the inner circumference of the hole part 251a' by welding.

The welding may be performed by applying heat to the outer circumference of the protrusion part 175 and the inner circumference of the hole part 251a' using a welding rod 10. As the result of the welding, a weld W1 may be formed. In addition, the protrusion part 175 may be integrated into the cap plate 171. Here, the diameter D2 of the protrusion part 175 is smaller than the diameter D1 of the hole part 251a'. In addition, the vertical height H5 of the protrusion part 175 is smaller than or substantially equal to the vertical height H4 of the hole part 251a'. In other words, the outer circumference of the protrusion part 175 may be spaced from the inner circumference of the hole part 251a'. A metal material is melted due to heat applied when the outer circumference of the protrusion part 175 and the inner circumference of the hole part 251a' are welded, and the melted metal material fills the space between the protrusion part 175 and the hole part 251a'. Therefore, the top surface of the first electrode terminal plate 251 may remain substantially flat. In a weld W2, however, when the protrusion part 175 and the hole part 251a' have substantially the same diameter, the metal material melted due to heat during welding may be formed on the first electrode terminal plate 251, which may make the top surface of the first electrode terminal plate 251 uneven.

In this way, the first electrode terminal plate 251 may be welded to the cap plate 171 at its open upper portion of the first electrode terminal plate 251, instead of the lateral portion of the first electrode terminal plate 251 at which the first electrode terminal plate 251 vertically contacts the cap plate 171, the welding can be easily performed.

Figure 6C:
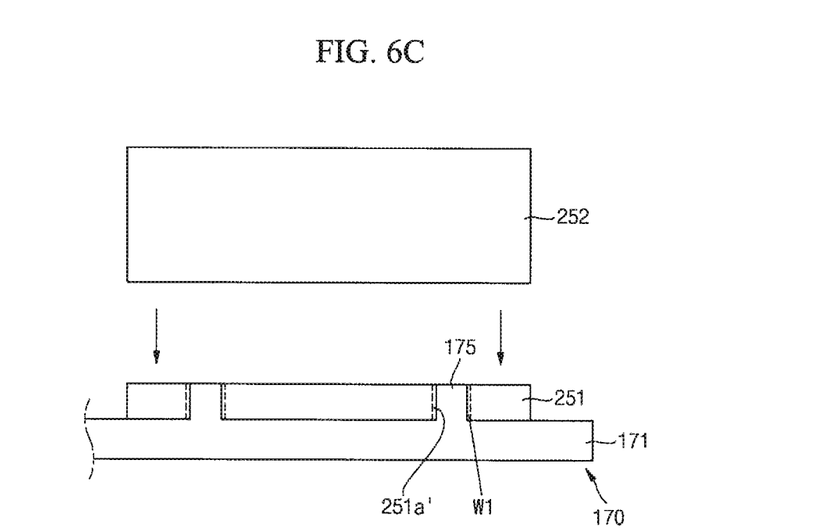

Referring to FIGS. 5 and 6C, in the first electrode bulk portion placing step (S40), the first electrode bulk portion 252 formed conforming to the upper portion of the first electrode terminal plate 251 is placed on the first electrode terminal plate 251. Here, the top surface of the first electrode terminal plate 251 remains flat so that the first electrode bulk portion 252 can closely contact the upper portion of the first electrode terminal plate 251 to then be placed thereon.

Figure 6D:
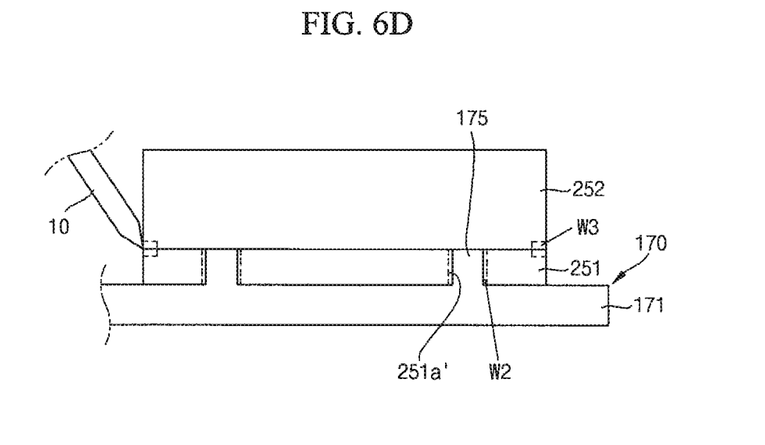

Referring to FIGS. 5 and 6D, in the second welding step (S50), an upper end of the lateral portion of the first electrode terminal plate 251 is coupled to a lower end of the lateral portion of the first electrode bulk portion 261 by welding. The welding may be performed by applying heat to the upper end of the lateral portion of the first electrode terminal plate 251 and the lower end of the lateral portion of the first electrode bulk portion 261 using a welding rod 10. As the result of the welding, welds W3 may be formed at the upper end of the lateral portion of the first electrode terminal plate 251 and the lower end of the lateral portion of the first electrode bulk portion 261.

Since the upper end of the lateral portion of the opened first electrode terminal plate 251 can be welded to the lower end of the lateral portion of the first electrode bulk portion 261, the welding can be easily performed. In addition, the first electrode bulk portion 261 can be securely coupled to the first electrode terminal plate 251.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
    an electrode assembly comprising a first electrode, a second electrode, and a separator located between the first electrode and the second electrode;
    a first collector plate electrically coupled to the first electrode;
    a case housing the electrode assembly and the first collector plate and having an opening;
    a cap assembly sealing the opening of the case and being electrically coupled to the first collector plate, the cap assembly comprising a cap plate having an opening sealed by a plug and at least one protrusion extending away from the cap plate and spaced from the plug;

a first electrode terminal comprising a first electrode terminal plate electrically coupled to the cap assembly, wherein the first electrode terminal plate has an opening and wherein the at least one protrusion on the cap plate is accommodated in the opening; and a second electrode terminal protruding through the cap assembly, electrically coupled to the second electrode and electrically insulated from the cap assembly.

2. The secondary battery as claimed in claim 1, wherein the first collector plate comprises:

a first extending part contacting the first electrode; and a first connecting part extending at an angle from the first extending part and contacting the cap assembly.

3. The secondary battery as claimed in claim 1, further comprising a second collector plate comprising a second extending part contacting the second electrode, and a second connecting part extending at an angle from the second extending part and contacting the second electrode terminal.

4. The secondary battery as claimed in claim 1, wherein the first electrode terminal plate has a plurality of openings, each of the openings engaging a respective one of the protrusions of the cap plate.

5. The secondary battery as claimed in claim 1, wherein the first electrode terminal plate includes:

a first flange part having the opening and contacting the cap assembly; and a second flange part extending at an angle from the first flange part and configured to contact an external device.

6. The secondary battery as claimed in claim 5, wherein the at least one protrusion and the first flange part are welded together at the opening.

7. The secondary battery as claimed in claim 5, wherein a height from a top surface of the cap assembly to a first end of the second flange part is substantially equal to a height from the top surface of the cap assembly to a first end of the second electrode terminal.

8. The secondary battery as claimed in claim 4, wherein the first electrode terminal plate has a flat portion, and further includes a first electrode bulk portion conforming to a surface of the first electrode terminal plate.

9. The secondary battery as claimed in claim 8, wherein the at least one protrusion and the first electrode terminal plate are welded together at the opening.

10. The secondary battery as claimed in claim 9, wherein a diameter of the at least one protrusion is smaller than a diameter of the opening.

11. The secondary battery as claimed in claim 8, wherein an upper end of a lateral portion of the first electrode terminal plate is coupled to a lower end of a lateral portion of the first electrode bulk portion.

12. The secondary battery as claimed in claim 8, wherein a height from a top surface of the cap assembly to a first end of the second electrode plate is substantially equal to a sum of a height from the top surface of the cap assembly to a first end of the first electrode terminal plate and a height from the first end of the first electrode terminal plate to a first end of the first electrode bulk portion.

13. The secondary battery as claimed in claim 8, wherein the first electrode terminal plate and the first electrode bulk portion comprise aluminum.

* * * * *